H. JONES.
REINFORCING BACK FOR BRAKE SHOES.
APPLICATION FILED FEB. 19, 1917.
1,224,867.
Patented May 1, 1917.
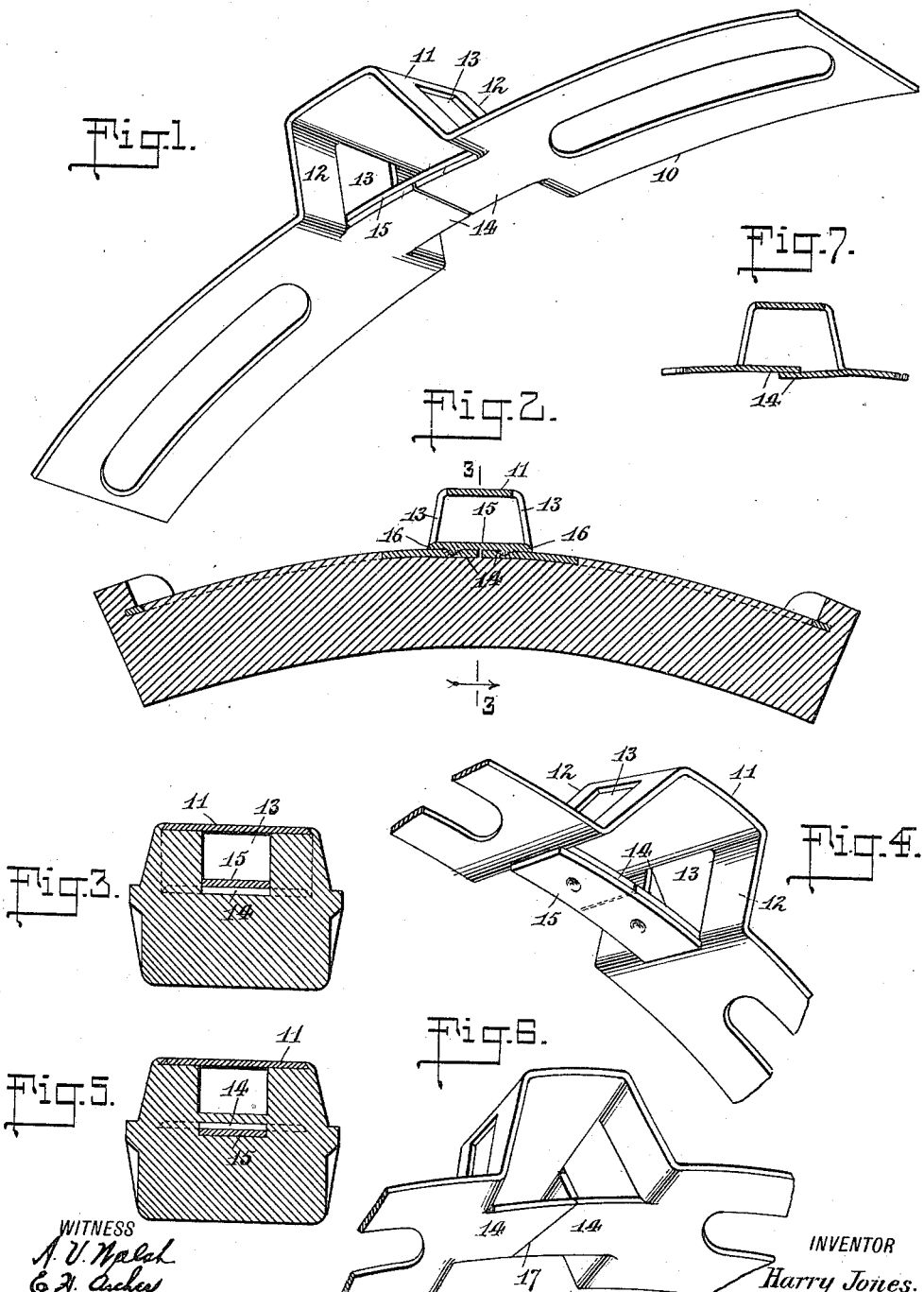
WITNESS
INVENTOR
Harry Jones.
BY
ATTORNEYS

UNITED STATES PATENT OFFICE.

HARRY JONES, OF SUFFERN, NEW YORK, ASSIGNOR TO THE AMERICAN BRAKE SHOE & FOUNDRY COMPANY, OF WILMINGTON, DELAWARE, A CORPORATION OF DELAWARE.

REINFORCING-BACK FOR BRAKE-SHOES.

1,224,867.   Specification of Letters Patent.   Patented May 1, 1917.

Application filed February 19, 1917. Serial No. 149,481.

*To all whom it may concern:*

Be it known that I, HARRY JONES, a citizen of the United States, and a resident of Suffern, in the county of Rockland and State of New York, have made and invented certain new and useful Improvements in Reinforcing-Backs for Brake-Shoes, of which the following is a specification.

My invention relates to reinforcing backs for brake shoes, and particularly to that type of back having an outwardly looped integral lug which is braced and reinforced by a tie plate extending across the open extremity of the lug, the lug being thereby held against spreading and the body metal directly beneath the lug being prevented from falling away should the same become broken and fractured. My invention comprehends a back of this type in which an improved form of tie plate is provided, and the lug braced and the sides thereof bound and tied together in a simple, novel and expeditious manner, and in such a way that a continuous reinforcement for the body of the shoe is provided.

In accomplishing the aforementioned ends, the openings in the lug, for the reception of the securing key, are utilized to form tongues which are bent into the general plane of the back and extend beneath the open lug. The confronting tongues are then fused and welded to a reinforcing plate, or, in some forms of my invention, are fused and welded together, whereby the back, lug, and lug reinforcement are formed as an integral and unitary structure; all of which features are incorporated in a back which may be easily and economically manufactured.

In accomplishing the aforementioned, and other objects, and in attaining the enumerated ends, I have provided the brake shoe back disclosed in its preferred embodiment in the accompanying drawings, wherein:

Figure 1 is a detail view in perspective of a brake shoe back embodying the characteristic features of my invention;

Fig. 2 is a view in longitudinal section of the foregoing, the back being incorporated in the body of a brake shoe;

Fig. 3 is a view in vertical section taken on the line 3—3 of Fig. 2;

Fig. 4 is a fragmental view in perspective of a brake shoe back, wherein the tie plate is welded to the under side of the tongues of the lug;

Fig. 5 is a view in central vertical section (similar to the view illustrated in Fig. 3) of a brake shoe, wherein the tie plate is welded to the under side of the tongues of the lug.

Fig. 6 is a fragmental view in perspective of the central and lug portion of my brake shoe back, wherein the tongues of the lug are united and formed as an integral tie plate by abutting and welding their extremities together;

Fig. 7 is a view in side elevation of a somewhat further modification of my improved brake shoe back.

Referring specifically to the several views, my improved reinforced back for brake shoe consists of a plate 10, the same being outwardly formed at its central portion to define an integral looped lug 11. The sides 12 of the lug are provided with openings 13 therein, the openings being so formed as to define tongues 14 which are bent downwardly and into the general plane of the back. A tie plate 15 is welded to the confronting tongues 14, preferably on the upper surface of said tongues, and becomes, in conjunction therewith, a unitary reinforcement extending across the open extremity of the lug and located in the general plane of the back. The welding of the tie plate to the tongues forms a rigid and permanent anchorage between the two, and at the same time provides a simple, efficient and economical reinforcement for the lug and back. An electric spot welder may be utilized to fuse and weld the tongues and tie plate together, or other forms of welding apparatus may be employed. In order to facilitate the passage of the holding key through the lug openings, the ends 16 of the tie plate, in the preferred form of my invention, are beveled and rounded, the same being clearly illustrated in Fig. 2.

In some instances, I may secure the tie plate to the under and lower surfaces of the tongues, as disclosed in Figs. 4 and 5; the securement of the tie plate and tongues being accomplished by welding, as before.

In some instances, I may omit the plate which reinforces and connects the tongues of the lug together as above described, and may weld the meeting extremities of the tongues together as disclosed in Figs. 6 and 7, the construction illustrated in Fig. 6 showing my improved back, wherein the tongues of the lug abut and the meeting extremities thereof are welded together along the line 16; or again the construction may be modified by overlapping the tongues as illustrated in Fig. 7. The overlapping extremities are welded and joined together and form a unitary structure, integral with the sides of the lug, whereby a rigid, permanent, and at the same time economical, securement and reinforcement is had for the looped lug portion of the back.

What I claim is:—

1. A back for brake shoes with an outwardly looped lug, and a reinforcement extending across the open extremity of the lug and fused or welded to the back.

2. A back for brake shoes with an outwardly looped lug, and a tie plate extending across the open extremity of the lug and fused or welded to the back adjacent the sides of the lug.

3. A back for brake shoes with an outwardly looped lug, and a tie plate extending across the open extremity of the lug and fused or welded to the back adjacent the sides of the lug, and located in the general plane of the back.

4. A back for brake shoes formed with a looped lug, and tongues extending across the open extremity of said lug, formed integral with the back, with the meeting extremities thereof welded together.

5. A back for brake shoes formed with a looped lug, tongues formed from the sides of the lug and projecting across the open extremity of said lug, with the meeting extremities of said tongues fused or welded together, forming a unitary and integral reinforcement for said lug and back.

6. A back for brake shoes formed with a looped lug, tongues projecting from the back beneath the said lug, and a tie plate extending across the open extremity of said lug and fused or welded to said tongues, forming in effect a single-piece reinforcement for said lug and back.

7. A reinforcing back for brake shoes with a looped lug, tongues projecting across the open extremity of said lug, and a tie plate positioned upon the top of said tongues and fused or welded thereto, defining a substantially unitary reinforcement for said lug.

8. A reinforcing back for brake shoes with a looped lug, tongues projecting across the open extremity of said lug, and a tie plate positioned upon the top of said tongues and fused or welded to said tongues, forming in effect a single-piece reinforcement for said lug, said tie plate provided with beveled ends adjacent the keyway openings in said lug.

Signed at Suffern, in the county of Rockland and State of New York this 8th day of February, A. D. 1917.

HARRY JONES.

Witnesses:
CHARLES A. SMALL,
CLARENCE E. MOONEY.

Copies of this patent may be obtained for five cents each, by addressing the "Commissioner of Patents, Washington, D. C."